(No Model.) 3 Sheets—Sheet 1.

C. A. & O. W. HULT.
ROTARY ENGINE.

No. 563,929. Patented July 14, 1896.

Witnesses:
E. B. Bolton
E. A. Scott

Inventors:
Carl Alrik Hult
Oscar Walfrid Hult

By
his Attorney (No Model.) 3 Sheets—Sheet 2.

C. A. & O. W. HULT.
ROTARY ENGINE.

No. 563,929. Patented July 14, 1896.

WITNESSES:
E. B. Bolton
E. A. Scott

INVENTORS:
Carl Alrik Hult
Oscar Walfrid Hult

BY

ATTORNEYS (No Model.)  C. A. & O. W. HULT.  3 Sheets—Sheet 3.
ROTARY ENGINE.

No. 563,929.  Patented July 14, 1896.

WITNESSES:
E. B. Bolton
E. A. Scott

INVENTORS:
Carl Abrik Hult
Oscar Walfrid Hult
BY
ATTORNEYS

UNITED STATES PATENT OFFICE.

CARL ALRIK HULT AND OSCAR WALFRID HULT, OF STOCKHOLM, SWEDEN.

ROTARY ENGINE.

SPECIFICATION forming part of Letters Patent No. 563,929, dated July 14, 1896.

Application filed January 8, 1896. Serial No. 574,749. (No model.) Patented in Sweden July 9, 1895, No. 6,515.

*To all whom it may concern:*

Be it known that we, CARL ALRIK HULT and OSCAR WALFRID HULT, mechanicians, subjects of the King of Sweden and Norway, and residents of 48 Flemminggatan, Stockholm, in the Kingdom of Sweden, have invented certain new and useful Improvements in Rotary Engines, (for which we have obtained a patent in Sweden, No. 6,515, dated July 9, 1895,) of which the following is a specification, reference being had therein to the accompanying drawings.

Our invention relates to engines or motors which are driven by steam or other fluid and in which a piston (or several pistons) rotates within a casing (or several casings.)

The invention has for its object to reduce the friction, which in this class of motors arises between the casing and the piston and parts mounted thereon. The reduction of this friction is according to this invention attained by permitting the casing to rotate with the piston, this being effected by arranging the casing in such a manner that it can turn freely, so that it is taken along by, and caused to rotate in the same direction as, the piston and the parts fixed thereto.

To enable our invention to be fully understood, we will describe how it can be carried out in practice by reference to the accompanying drawings, in which—

Figure 1:
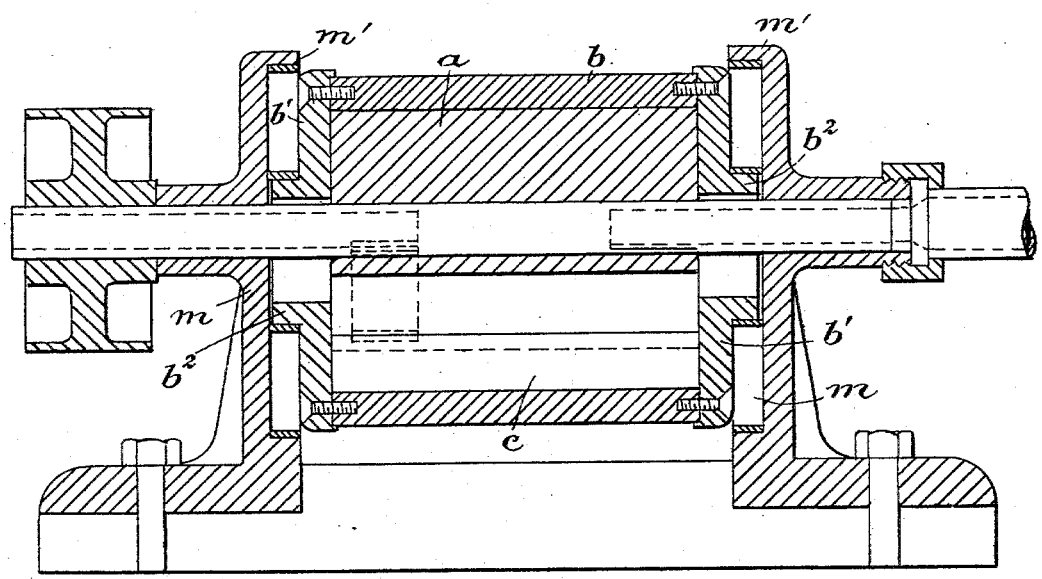
Figure 2:
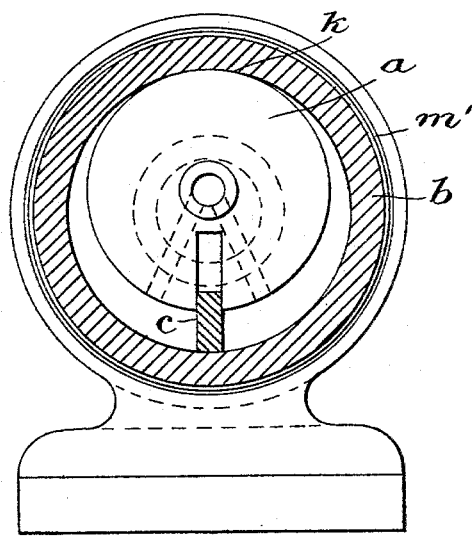
Figure 3:
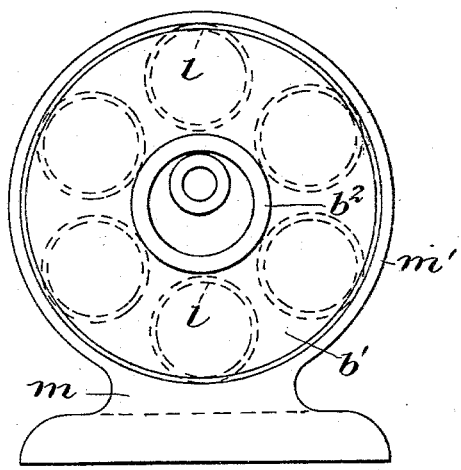
Figure 5:
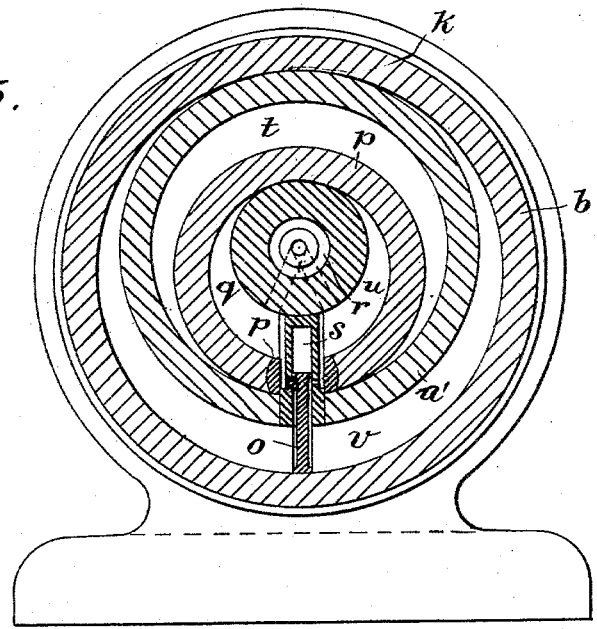
Figure 5:
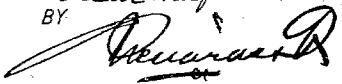
Figure 4:
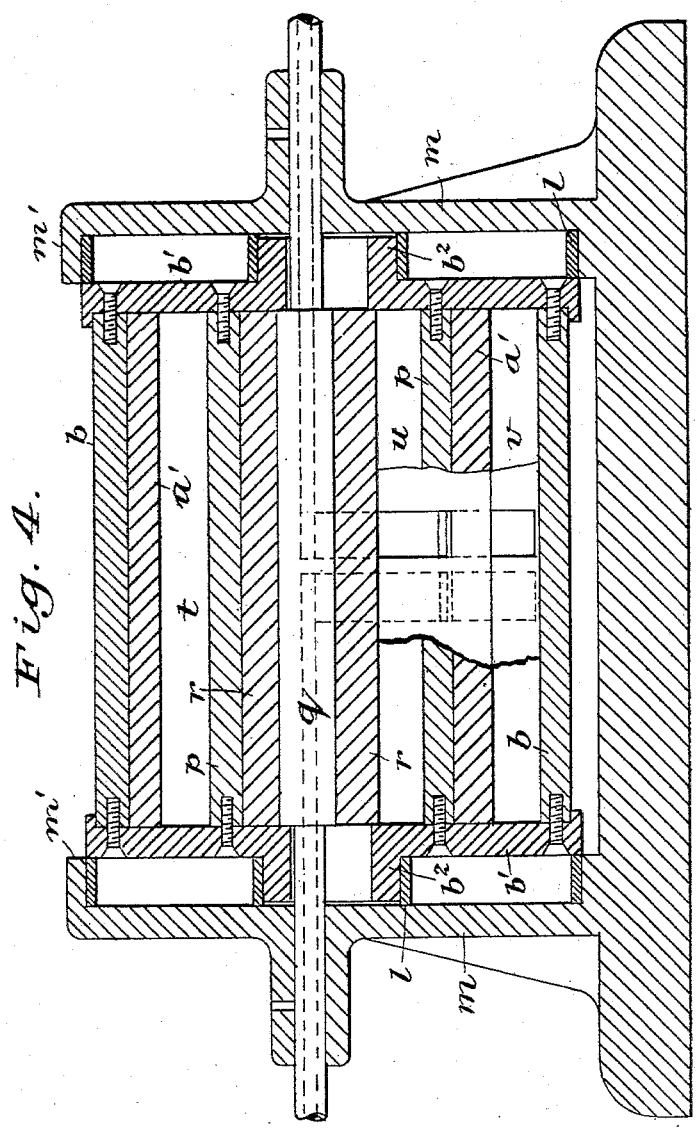
Figure 7:
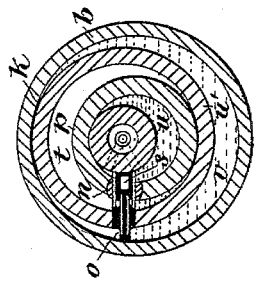
Figure 6:
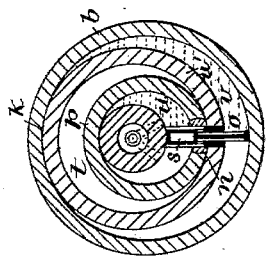

Figures 1 to 3 show, as an example, a rotary motor with a casing partaking of the rotation of the piston, Fig. 1 being a longitudinal section of the motor, and Fig. 2 a cross-section of the same, while Fig. 3 shows an end view of the casing and an end piece or bearing at the other end of the casing. Figs. 4 and 5 show a longitudinal section and a cross-section, respectively, of a motor having an outer casing and an inner one, the latter rotating concentrically with the former within a piston corresponding to the outer casing. Figs. 6 and 7 are diagrams of the motor shown in Figs. 4 and 5, illustrating the working of the motor.

In the motor illustrated in Figs. 1 to 3, the piston $a$ consists of a cylindrical body placed eccentrically in the casing in such a manner that it rests against the inner side of the annular part or drum $b$ of the casing. In the piston is inserted a radially-sliding piece $c$, situated between two passages, each leading from the passages for fresh steam and waste steam, respectively, (the driving fluid being supposed to be steam,) which are arranged in the motor-shaft so that the space on one side of the slide $c$ always communicates with the steam-inlet and the space on the other side of the slide with the steam-outlet.

For reducing the friction between the piston $a$ and the slide $c$ on the one hand and the casing on the other hand, which casing consists of the drum $b$ and the end pieces $b'$, the casing is arranged so as to rotate in the same direction as the piston. This can be attained in many ways, the way illustrated in the drawings having proved to be very suitable. On the end pieces $b'$ are arranged collars or flanges $b^2$, which are concentric with the ring or drum $b$, and the outer sides of which form an inner track for a number of yielding rings $l$ placed around the flanges $b^2$. The outer tracks of these yielding rings are formed by the inner sides of flanges $m'$, arranged on the end pieces of the motor-frame. The flanges $m'$ are obviously concentric with the flanges $b^2$, which are eccentric with the piston and the shaft. By employing yielding rings $l$ suitable tightening in the line $k$ of contact between the drum and the piston is obtained.

When the piston rotates, the drum $b$ and the end pieces $b'$ are taken along by the same in consequence of the pressure at $k$, where only rolling friction exists. As the movement at other contact-points has the same direction, the friction is obviously reduced.

The motor illustrated in Figs. 4 and 5 is shown as an example of the application of this invention to motors having an outer casing and an inner one, which both rotate for reducing the friction at the points of contact with other parts of the motor. As regards the outer casing $b\ b'$ and the journaling of the same, this motor is arranged in the same manner as the motor shown in Figs. 1 to 3. The outer casing corresponds to the piston $a'$, in which a slide $o$ moves inward and outward, as in the hereinbefore-described motor. In this case the piston consists of an eccentric ring or drum in contract with the drum $b$ at $k$, and against the inner side of which bears a drum $p$, concentric with the drum $b$. This drum $p$, together with the end pieces $b'$, form the inner casing which surrounds a roller $r$, keyed to the enlarged motor-shaft $q$ and bearing against the inside of the drum $p$. In this roller are arranged passages, extending from the inlet and outlet passages for the driving fluid in the motor-shaft, the arrangement being the same as in the hereinbefore-described motor, that is to say, each passage extends from its separate passage in the shaft and opens on one side of a partition $s$, which, however, is fixed with respect to the roller $r$, but in which partition the slide $o$ can move inward and outward. The drums $b$ and $p$ are, by means of screws, fastened to the end pieces $b'$, so that they form a single piece and turn together, just like the pistons $a'$ and $r$, which are firmly connected to each other by means of the partition $s$. In the drum $p$ is fixed a revoluble packing $n$, permitting the drum $p$ to slide to and fro upon the partition $s$ and to occupy different inclinations with respect to the same. In the parts $o$ and $s$ are made recesses and openings, as shown in Fig. 7. In this motor the driving fluid acts on the parts $o$ and $s$ in three spaces—viz., the spaces $t$, $u$, and $v$. (See Figs. 6 and 7.) When the pressure-surfaces of the said parts in the spaces $u$ and $v$ are at a maximum, (in the position shown in Figs. 5 and 6,) the pressure-surface in the space $t$ is $nil$, but as the rotation continues, the last-mentioned surface increases, while the first-mentioned surfaces decrease, so that it is at a maximum when the latter are $nil$, (after half a revolution from the position shown in Figs. 5 and 6.) In this position the pressure on the surface in the space $t$ is also acting with its greatest force. Thus it is evident that in this motor there is no dead-point, and the shaft of the motor will be rotated by a slightly-varying momentum of force.

By arranging the parts $o$ and $s$ in a suitable manner the motor can work with double or multiple expansion. If the drum $b$ and the slide $o$ are dispensed with, the motor will obtain two pressure-spaces and a more uniform turning movement.

The casing can be caused to partake of the rotation of the piston in many other ways. For instance, by surrounding the annular part of the casing with balls or rollers or by employing an ordinary fixed bearing.

Having now described our invention, what we claim as new, and desire to secure by Letters Patent, is—

1. In combination, the shaft, the piston arranged concentric therewith, the frame, the cylinder arranged concentric with the shaft, the spring-supports between the cylinder and the frame and the abutment arranged to slide in the piston, the said cylinder being free to rotate through the frictional contact between it and the piston and its abutment and having frictional contact with the spring-supports, substantially as described.

2. In combination, the cylinder having the heads $b'$ with the projecting circular flanges, the frame having the flanges $m'$ the springs $l$ interposed between the flanges of the cylinder and the flanges of the frame and the piston arranged concentric on its shaft and having a sliding abutment to contact with the cylinder, substantially as described.

3. In combination, the drum $b$, the piston consisting of the eccentric ring $a'$ having the slide $o$ and in contact with the drum at one point, the drum $p$ concentric with the drum $b$ and bearing on the piston-ring $a'$, the roller $r$ on the shaft bearing on the inside of the drum $p$ and having the steam-passages therein, the radially-extending partition $s$ and adapted to permit the slide $o$ to move therein the said drums $b$ and $p$ being connected together to move in unison, substantially as described.

In witness whereof we have hereunto signed our names in the presence of two subscribing witnesses.

CARL ALRIK HULT.
    OSCAR WALFRID HULT.

Witnesses:
 ERNST SVANQUIST,
 TRITIOF LINDGREN.